United States Patent
Choi

(10) Patent No.: US 12,557,129 B2
(45) Date of Patent: Feb. 17, 2026

(54) METHOD AND APPARATUS FOR CHANNEL CONFIGURATION IN BACKHAUL SYSTEM

(71) Applicant: ELECTRONICS AND TELECOMMUNICATIONS RESEARCH INSTITUTE, Daejeon (KR)

(72) Inventor: Eun Young Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 615 days.

(21) Appl. No.: 17/994,569

(22) Filed: Nov. 28, 2022

(65) Prior Publication Data
US 2023/0209580 A1    Jun. 29, 2023

(30) Foreign Application Priority Data

Dec. 27, 2021 (KR) ........................ 10-2021-0188370

(51) Int. Cl.
*H04W 72/53* (2023.01)
*H04L 1/00* (2006.01)

(52) U.S. Cl.
CPC ........... *H04W 72/53* (2023.01); *H04L 1/0003* (2013.01)

(58) Field of Classification Search
CPC .............................. H04W 72/53; H04L 1/0003
See application file for complete search history.

(56) References Cited

U.S. PATENT DOCUMENTS

| | | | |
|---|---|---|---|
| 10,009,159 B2 | 6/2018 | Chung et al. | |
| 10,756,946 B2 | 8/2020 | Lincoln et al. | |
| 10,805,931 B2 | 10/2020 | Cho et al. | |
| 2011/0038303 A1 | 2/2011 | Ji et al. | |
| 2019/0159233 A1* | 5/2019 | Huang | H04W 72/20 |
| 2020/0145967 A1* | 5/2020 | Park | H04W 72/23 |
| 2020/0228966 A1 | 7/2020 | Xu et al. | |
| 2020/0229271 A1* | 7/2020 | You | H04W 72/23 |
| 2020/0245333 A1* | 7/2020 | Lin | H04L 1/0026 |
| 2020/0274656 A1* | 8/2020 | Gordaychik | H04L 1/1896 |
| 2020/0304230 A1* | 9/2020 | Papasakellariou | H04L 5/0094 |

(Continued)

FOREIGN PATENT DOCUMENTS

| | | |
|---|---|---|
| KR | 10-2014-0077327 A | 6/2014 |
| KR | 10-2021-0108956 A | 9/2021 |

OTHER PUBLICATIONS

Mao Wang et al., "The Evolution of LTE Physical Layer Control Channels", IEEE Communications Surveys & Tutorials, vol. 18, No. 2, Second Quarter 2016.

(Continued)

*Primary Examiner* — Jael M Ulysse
(74) *Attorney, Agent, or Firm* — LRK PATENT LAW FIRM

(57) ABSTRACT

An operation method of a backhaul station in a wireless backhaul system may include: receiving, from a base station, information on a required capacity of a data channel resource; identifying a channel state of the base station; allocating the data channel resource from an available capacity based on the required capacity and the channel state; and transmitting, to the base station, a message including resource allocation information of the data channel resource.

14 Claims, 9 Drawing Sheets

(56) References Cited

U.S. PATENT DOCUMENTS

| | | | |
|---|---|---|---|
| 2020/0314856 A1* | 10/2020 | Bang | H04L 5/0094 |
| 2020/0314858 A1* | 10/2020 | Xu | H04W 72/21 |
| 2020/0383131 A1 | 12/2020 | Wang et al. | |
| 2021/0037554 A1 | 2/2021 | Kim et al. | |
| 2021/0058826 A1* | 2/2021 | Mao | H04W 28/0933 |
| 2021/0058989 A1* | 2/2021 | Simsek | H04L 47/283 |
| 2021/0160836 A1 | 5/2021 | Lee et al. | |
| 2021/0282140 A1 | 9/2021 | Moon et al. | |
| 2021/0321276 A1 | 10/2021 | Kim et al. | |
| 2022/0086794 A1* | 3/2022 | Lee | G01S 5/10 |
| 2022/0110148 A1* | 4/2022 | Oh | H04W 72/23 |
| 2022/0279518 A1 | 9/2022 | Lin et al. | |
| 2024/0236736 A1* | 7/2024 | Oh | H04W 8/22 |

OTHER PUBLICATIONS

AT&T, "Support of Rel-15 UE features by IAB-MTs", 3GPP TSG-RAN WG1 Meeting #101, R1-2004282, e-Meeting, May 25-Jun. 5, 2020.

Sharp, "VoIP Capacity Improvement by CQI Optimization in PUCCH", 3GPP TSG-RAN WG1#52bis, R1-081243, Shenzhen, China, Mar. 31-Apr. 4, 2008.

Motorola, "Backhaul control channel design", 3GPP TSG RAN WG1 Meeting #62 R1-104717, Madrid, Spain, Aug. 23-27, 2010.

Huawei, Hisilicon, "O n the performance of IAB solution s", 3GPP TSG RAN WG 1 M eeting 9 3 R 1 1806907, Busan, Korea May 21-25, 2018.

* cited by examiner

METHOD AND APPARATUS FOR CHANNEL CONFIGURATION IN BACKHAUL SYSTEM

CROSS-REFERENCE TO RELATED APPLICATION

This application claims priority to Korean Patent Application No. 10-2021-0188370, filed on Dec. 27, 2021, with the Korean Intellectual Property Office (KIPO), the entire contents of which are hereby incorporated by reference.

BACKGROUND

1. Technical Field

Exemplary embodiments of the present disclosure relate to a channel configuration technique, and more specifically, to a backhaul system channel configuration technique for a wireless backhaul system to configure channels to support data capacity of each base station.

2. Description of Related Art

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

On the other hand, in the communication system, a backhaul link connecting a core network and each base station may use an ultra-high frequency (e.g., terahertz (THz)) band that is easy to secure available frequency resources as a required data capacity increases. Such backhaul link may be formed wirelessly and may support a data capacity of each base station using the backhaul link. To this end, a downlink transmitting end of a wireless backhaul system may allocate a data channel resource to each base station based on the required capacity of each base station. In this case, a control channel transmitted from the downlink transmitting end to a downlink receiving end (i.e., a receiving end of each base station) may need to reliably schedule the data channel resource allocated to each base station. In addition, the control channel may need to be demodulated reliably at the downlink receiving end.

SUMMARY

Accordingly, exemplary embodiments of the present disclosure are provided to substantially obviate one or more problems due to limitations and disadvantages of the related art.

Exemplary embodiments of the present disclosure provide a method and an apparatus for channel configuration in a backhaul system, which are used for a wireless backhaul system to support data capacity of each base station.

According to a first exemplary embodiment of the present disclosure, an operation method of a backhaul station in a wireless backhaul system may comprise: receiving, from a base station, information on a required capacity of a data channel resource; identifying a channel state of the base station; allocating the data channel resource from an available capacity based on the required capacity and the channel state; and transmitting, to the base station, a message including resource allocation information of the data channel resource.

The allocating of the data channel resource may comprise: allocating a resource corresponding to the required capacity from the available capacity as a reserved capacity for the data channel resource; and adjusting the reserved capacity according to the channel state, and allocating a resource corresponding to the adjusted reserved capacity as the data channel resource.

The operation method may further comprise: dividing modulation and coding scheme (MCS) indexes into a plurality of sections; allocating candidate control channel element (CCE) aggregation levels to each of the plurality of sections; and providing the base station with information on the MCS indexes of each of the plurality of sections and information on the candidate CCE aggregation levels of each of the plurality of sections.

The transmitting of the message including the resource allocation information may comprise: calculating an MCS index corresponding to the channel state of the base station and selecting one CCE aggregation level from candidate CCE aggregation levels corresponding to a section including the calculated MCS index; allocating a control channel resource according to the selected CCE aggregation level in a control resource region; and transmitting the message including the resource allocation information to the base station by using the allocated control channel resource.

The transmitting of the message including the resource allocation information may comprise: determining a CCE aggregation level according to the allocated data channel resource; allocating a control channel resource according to the determined CCE aggregation level in a control resource region; and transmitting the message including the resource allocation information to the base station by using the allocated control channel resource.

The operation method may further comprise: repeatedly allocating a control channel resource according to the determined CCE aggregation level in the control resource region; and transmitting the message including the resource allocation information to the base station by using the repeatedly-allocated control channel resource.

The operation method may further comprise: determining corresponding MCS indexes for each CCE aggregation level; setting a shortened MCS index having the each CCE aggregation level as most significant 2 bits for each MCS index; and providing the base station with information on each CCE aggregation level, information on the MCS indexes, and information on the shortened MCS index corresponding to each MCS index.

According to a second exemplary embodiment of the present disclosure, an operation method of a base station in a backhaul system may comprise: measuring a channel state by receiving a reference signal transmitted from a backhaul station; transmitting the measured channel state to the backhaul station; transmitting a required capacity to the backhaul station to request allocation of a data channel resource; and receiving, from the backhaul station, a message including resource allocation information of the data channel resource, the resource allocation information being configured based on the requested capacity and the channel state.

The operation method may further comprise receiving, from the backhaul station, information on a plurality of MCS index sections into which MCS indexes are divided and information on candidate CCE aggregation levels allocated to each section.

The receiving of the message including the resource allocation information may comprise: calculating an MCS index corresponding to the measured channel state, and selecting candidate CCE aggregation levels corresponding to a section including the calculated MCS index; and receiving the resource allocation information by performing blind decoding on the selected candidate aggregation levels.

The operation method may further comprise receiving, from the backhaul station, information of an MCS index corresponding to each CCE aggregation level and information on a shortened MCS index having each CCE aggregation level as most significant 2 bits for each MCS index.

The receiving of the message including the resource allocation information may comprise: detecting a CCE aggregation level of the message; identifying a shortened MCS index included in the message; and calculating an MCS index corresponding to the detected CCE aggregation level and the shortened MCS index included in the message with reference to the information on the MCS index and the information on the shortened MCS index.

According to a third exemplary embodiment of the present disclosure, a base station in a backhaul system may comprise: a processor; a memory electronically communicating with the processor; and instructions stored in the memory, wherein when executed by the processor, the instructions cause the base station to: measure a channel state by receiving a reference signal transmitted from a backhaul station; transmit the measured channel state to the backhaul station; transmit a required capacity to the backhaul station to request allocation of a data channel resource; and receive, from the backhaul station, a message including resource allocation information of the data channel resource, the resource allocation information being configured based on the requested capacity and the channel state.

The instructions may further cause the base station to receive, from the backhaul station, information on a plurality of MCS index sections into which MCS indexes are divided and information on candidate CCE aggregation levels allocated to each section.

In the receiving of the message including the resource allocation information, the instructions may further cause the base station to: calculate an MCS index corresponding to the measured channel state, and select candidate CCE aggregation levels corresponding to a section including the calculated MCS index; and receive the resource allocation information by performing blind decoding on the selected candidate aggregation levels.

The instructions may further cause the base station to receive, from the backhaul station, information of an MCS index corresponding to each CCE aggregation level and information on a shortened MCS index having each CCE aggregation level as most significant 2 bits for each MCS index.

In the receiving of the message including the resource allocation information, the instructions may further cause the base station to: detect a CCE aggregation level of the message; identify a shortened MCS index included in the message; and calculate an MCS index corresponding to the detected CCE aggregation level and the shortened MCS index included in the message with reference to the information on the MCS index and the information on the shortened MCS index.

According to the present disclosure, the wireless backhaul system may allocate a data channel resource in consideration of a priority, channel state, and required capacity of each base station. In addition, the wireless backhaul system may transmit resource allocation information of a data channel to each base station in association with a CCE aggregation level. As a result, the wireless backhaul system can increase resource efficiency by minimizing resources allocated for a control channel. In addition, according to the present disclosure, a downlink transmitting end and a downlink receiving end of the wireless backhaul system may share information on a candidate CCE aggregation level according to a channel state. Accordingly, the downlink receiving end of the wireless backhaul system may identify the candidate CCE aggregation level based on the channel state. Further, the downlink receiving end may perform blind decoding on a search space of the identified candidate CCE aggregation level, thereby reducing decoding complexity.

DETAILED DESCRIPTION OF THE EMBODIMENTS

Figure 1:
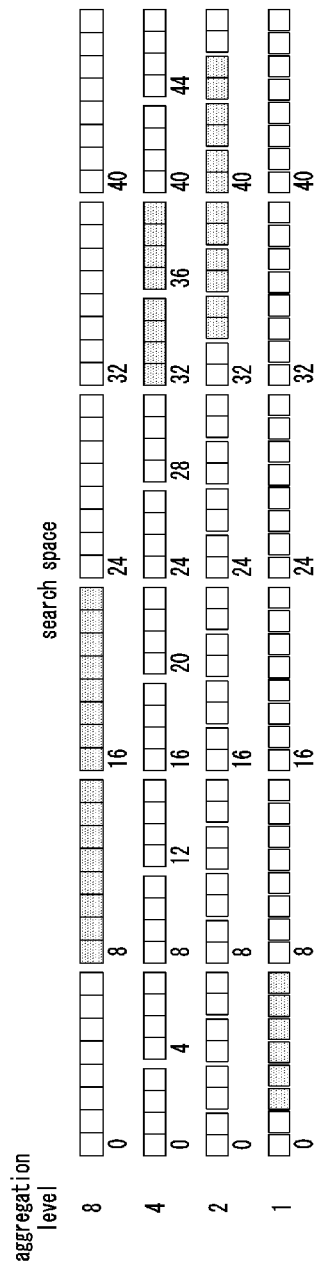
FIG. 1 is a conceptual diagram illustrating a first exemplary embodiment of a method for allocating a PDCCH as a control channel.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, beyond 5G (B5G) mobile communication network (e.g., 6G mobile communication network), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

On the other hand, in the communication system, a backhaul link connecting a core network and each base station may use an ultra-high frequency (e.g., terahertz (THz)) band that is easy to secure available frequency resources as a required data capacity increases. Such backhaul link may wirelessly connect a core network and each base station to provide high-capacity traffic (e.g., ~Tbps) by utilizing the terahertz band. When the backhaul link is configured wirelessly as described above, it is possible to provide scalability to install base stations in network configuration. In addition, the backhaul link may facilitate the base stations to support mobile services.

A wireless backhaul system including such the backhaul link may support a data capacity of each base station using the backhaul link. To this end, a downlink transmitting end of the wireless backhaul system may allocate a data channel resource to each base station based on the required capacity of each base station. In this case, a control channel transmitted from the downlink transmitting end to a downlink receiving end (i.e., a receiving end of each base station) may need to reliably schedule the data channel resource allocated to each base station. In addition, the control channel may need to be demodulated reliably at the downlink receiving end. As a result, the wireless backhaul system may need to configure a control channel other than control channels configured for accessing a plurality of terminals in the existing LTE/NR access links.

Meanwhile, it may be necessary to minimize influence on a terminal accessing each base station, which is caused by a change in resource capacity according to a channel state of the backhaul link. To this end, the wireless backhaul system may allocate a sufficient resource capacity to each base station. Accordingly, the wireless backhaul system may allocate sufficient resources to some base stations rather than evenly allocating resources to all base stations. The length of one orthogonal frequency division multiplexing (OFDM) symbol in an ultra-high frequency band (e.g., terahertz) may be short. In addition, the length of a frame configured based on the OFDM symbols may be short.

Accordingly, the wireless backhaul system may allocate a sufficient resource capacity to some base stations at a specific time. To this end, the wireless backhaul system may prefer to support a small number of base stations in consideration of channel states. In addition, the wireless backhaul system may consider temporal scheduling to ensure a sufficient resource capacity for some base stations at a specific time.

Meanwhile, in the 3GPP LTE/NR system, a transmitting end may configure downlink control information (DCI) according to a usage. In addition, the transmitting end may transmit the configured DCI to a receiving end through physical resource allocation according to a control channel element (CCE) aggregation level of 1 to 16. In this case, in order to ensure higher reliability, a resource allocated to a control channel may increase as the CCE aggregation level increases. Accordingly, the receiving end may perform blind decoding on CCEs. In this case, the position of CCEs may be determined according to the CCE aggregation level. Accordingly, the receiving end may perform decoding on all possible positions according to the limited number of blind decodings.

Meanwhile, a control channel may be configured within a control resource set (CORESET). One CORESET may be allocated anywhere in 1 to 3 consecutive OFDM symbols within one slot in the time domain. In addition, one CORESET may be allocated in units of 6 resource blocks (RBs) by using $N_{RB}^{CORESET}$ RBs within a corresponding bandwidth part in the frequency domain.

One CCE may be composed of 6 resource element groups (REGs). One REG may be equal to one RB in one OFDM symbol. The transmitting end may perform a CCE-REG mapping operation without interleaving. Alternatively, the transmitter may perform the CCE-REG mapping operation in an interleaving manner according to a REG bundling size {2, 6}. The transmitting end may configure a control channel by using quadrature phase shift keying (QPSK). The control channel configured as described above may carry information of 108 bits in resource elements (REs) excluding a demodulation reference signal (DM-RS) within one CCE. Here, an overhead according to the reference signal may be ¼.

In the NR system, the position of CCEs may be determined within a CORESET according to the CCE aggregation level. The CCEs within the CORESET may be arranged in order. A physical downlink control channel (PDCCH) may be allocated to an interval position of the CCE aggregation level by applying the CCE aggregation level determined according to the channel state.

FIG. 1 is a conceptual diagram illustrating a first exemplary embodiment of a method for allocating a PDCCH as a control channel.

Referring to FIG. 1, a base station may sequentially index CCEs as 0,1,2,3,4,5, and the like. Then, the base station may allocate a PDCCH to an interval position of a corresponding CCE aggregation level. For example, when the CCE aggregation level is 1, the base station may allocate a PDCCH to one CCE consecutively from the CCE 0, 1, 2, . . . , or n. As another example, when the CCE aggregation level is 2, the base station may allocate a PDCCH to 2 CCEs consecutively from the CCE 0, 2, 4, . . . , or 2n. As another example, when the CCE aggregation level is 4, the base station may allocate a PDCCH to 4 CCEs consecutively from the CCE 0, 4, 8, . . . , or 4n. As another example, when the CCE aggregation level is 8, the base station may allocate a PDCCH to 8 CCEs consecutively from the CCE 0, 8, 16, . . . , or 8n. The base station may allocate a PDCCH to be transmitted to a control channel region through this process.

The terminal may search CCE(s) of a search space to find its PDCCH in the control channel region. In this case, the terminal may not have information on a DCI type and a CCE aggregation level for its PDCCH. Accordingly, the terminal may perform blind decoding to find all possible CCE start positions according to the types of possible CCE aggregation levels. In this case, a CCE index of an aggregation level L may correspond to a PDCCH candidate $m_{s,n_{CI}}$, of a search space set within a slot $n_{s,f}^{\mu}$ in an active downlink BWP, with respect to a search space set s allocated to a CORESET p. The CCE index of the aggregation level L may be equal to Equation 1.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i \quad \text{[Equation 1]}$$

Here, in case of a common search space, $Y_{p,n_{s,f}^{\mu}}=0$, and in case of a UE-specific search space, $Y_{p,n_{s,f}^{\mu}}=(A_p \cdot Y_{p,n_{s,f}^{\mu}-1})$. In this case, $A_p$ may 39827 for a case of p mod 3=0, $A_p$ may be 39829 for a case of p mod 3=1, and $A_p$ may be 39839 for a case of p mod 3=2. D may be 65537. $N_{CCE,p}$ may be the number of CCEs indexed from 0 to $N_{CCE,p}-1$ in the CORESET p.

Meanwhile, the terminal may perform blind decoding by combining the number of CCE aggregation levels and all CCE positions in the control channel region. As a result, the number of blind decodings may be too large. Accordingly, in order to limit complexity, the communication system may limit the number of candidates for allocable CCE start positions of PDCCHs to be decoded, and thus the burden of the terminal searching for CCEs in too many positions may be relieved. In the case of NR, the maximum value $M_{PDCCH}^{max sbt,\mu}$ of the number of PDCCH candidates for blind decoding according to a subcarrier spacing configuration may be as shown in Table 1 below. Here, a subcarrier spacing (SCS) may be a subcarrier space.

TABLE 1

| SCS configuration μ | The maximum number $M_{PDCCH}^{m\,ax,\,sbt,\,\mu}$ of PDCCH candidates in a serving cell |
|---|---|
| 0 | 44 |
| 1 | 36 |
| 2 | 22 |
| 3 | 20 |

Unlike the LTE system, the NR communication system may configure a search space for each CCE aggregation level, and thus the NR communication system may configure the number of processes more flexibly. Here, a search space may be a set of candidate control channels of a given CCE aggregation level. Accordingly, there may be a plurality of search spaces according to a plurality of CCE aggregation levels. One search space set may be a set of search spaces having different aggregation levels within the same CORESET. Up to 10 search space sets may be configured for each of 4 BWPs. As the base station supports more types of CCE aggregation levels, it may have a wider search region. In addition, as the base station supports a plurality of terminals, it may have a wider search region. Accordingly, the number of blind decodings may increase because the terminal needs to check several allocation positions. Also, the number of blind decodings may increase as the number of DCI types to be distinguished increases.

Accordingly, the base station may minimize control channel resources and secure a lot of data channel resources, thereby increasing resource efficiency. In addition, the base station may configure control channels while maintaining a resource capacity secured to support data services of the base station using the backhaul link. In addition, it may be necessary to lower the decoding complexity when the terminal decodes the control channel.

To this end, a downlink control channel proposed in the present disclosure can ensure a link capacity for each base station in consideration of the characteristics of the backhaul link. In addition, the downlink control channel proposed in the present disclosure can increase resource efficiency for reliable control channels by minimizing resource allocation. In addition, the control channel proposed in the present disclosure can reduce the decoding complexity.

As described above, an ultra-high frequency band may be regarded as a candidate frequency for large-capacity transmission because it is easy to secure available resources. A representative candidate of the ultra-high frequency band may be a THz band. For backhaul and access links that require large-capacity transmission, a modulation/demodulation technology suitable for high-speed transmission may be developed and applied by using a wideband of the ultra-high frequency band. In particular, a mobile wireless backhaul may require reliable control channels to secure high-speed transmission and mobility.

Meanwhile, as described above, in the case of NR, the base station may deliver DCI to the terminal on a PDCCH. In this case, the DCI may include, according to a DCI format, one or more among uplink power control indication information, slot format indication information, or information on 'no transmission' physical resource blocks (PRBs) or OFDM symbols for the terminal, as well as transmission resource allocation information of a physical downlink shared channel (PDSCH) and a physical uplink shared channel (PUSCH). In this case, the base station may configure the PDCCH by determining the size of resource required for information transmission to secure reliability in consideration of a channel state of the terminal.

The base station may transmit a plurality of PDCCHs to terminals by allocating the plurality of PDCCHs for the terminals to a control channel region. Then, each terminal may receive a control channel. In addition, the terminal may obtain control information from the control channel received in the control channel region. Each terminal may obtain its own time domain and frequency domain allocation information and information for PDSCH demodulation and decoding from the obtained control information.

In addition, each terminal may transmit a PUSCH by obtain time and frequency domain resource allocation information for uplink transmission and modulation and coding information for the uplink transmission from the obtained control information. The PDCCH may be allocated to the CORESET resource region. The terminal may obtain the control information after monitoring the CORESET through the process of performing blind detection on PDCCH candidates in the configured search space. The CORESET may be configured in REG units. The number of REGs included in the CORESET may be a multiple of 6. A PDCCH may be configured in CCE units. One CCE may be 6 REGs. Here, the CCEs may be logical resources. A CCE-REG mapping scheme may include an interleaving scheme or a non-interleaving scheme.

In this regard, the mobile communication system may provide allocable candidate positions according to a CCE aggregation level in the CORESET to which PDCCHs for support a plurality of terminals are mapped. Such the candidate positions may be continuously located at positions corresponding to multiples of the aggregation level.

As described above, the NR communication system may have a structure that supports a plurality of terminals through access links. Accordingly, the base station of the communication system may allocate PDCCHs through a plurality of CORESETs and a plurality of search spaces, and may transmit the PDCCHs to the terminals. On the other hand, the backhaul link may need to be configured to transmit a reliable control channel in terms of securing capacity of a service support base station.

When the communication system uses a wide band for large-capacity transmission, the wide band may be divided into multiple carriers for frequency utilization and processing speed support. In this case, the base station may transmit control information for data channel resource utilization of each carrier to the terminal by using a resource in each carrier. Alternatively, the base station may transmit control information for data channel resource utilization of a carrier to the terminal using a resource of another carrier. In this case, the base station may provide the terminal with carrier indication information indicating which carrier the current control information is information about.

Meanwhile, the communication system may secure a capacity provided by the base station by extending a communication band using a plurality of carriers. In this case, each base station using the backhaul link may be a point connected to the access link. Accordingly, the base station may need to secure a predetermined capacity to secure a data transmission opportunity and capacity of each terminal when the terminal accesses the base station. The wireless backhaul system may refer to a reference value of a capacity to be secured by the base station for the access link. In addition, a downlink transmitting end of the wireless backhaul system may allocate a data channel for each base station.

Unlike a wired backhaul link, a wireless backhaul link may not easily secure a predetermined capacity under influence of a wireless channel. In addition, when a channel state of the backhaul link is poor, the wireless backhaul system may allocate all available resources in one or more carriers for a data channel for one base station. To this end, the wireless backhaul system may need to limit the number of supported base stations in consideration of the link capacity to be secured according to a supported bandwidth rather than flexible terminal scheduling based on higher layer information like the NR system.

Figure 2:
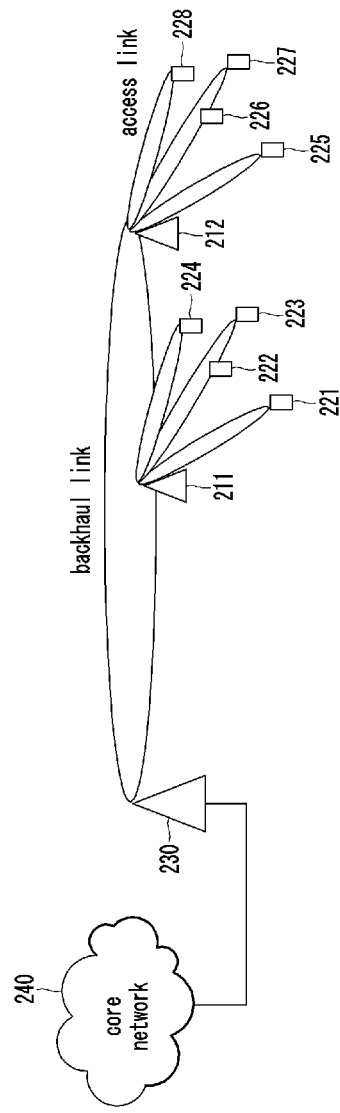
FIG. 2 is a conceptual diagram illustrating a first exemplary embodiment of a wireless backhaul system.

FIG. 2 is a conceptual diagram illustrating a first exemplary embodiment of a wireless backhaul system.

Referring to FIG. 2, a wireless backhaul system may include a plurality of base stations 211 and 212, a plurality of terminals 221 to 228, a backhaul station 230, and a core network 240. Here, the first base station 211 among the plurality of base stations 211 and 212 may provide a communication service to a plurality of first terminals 221 to 224. In addition, the second base station 212 may provide a communication service to a plurality of second terminals 225 to 228. The backhaul station 230 may transmit/receive data between the core network 240 and the plurality of base stations 211 and 212. The backhaul station 230 may be connected to the core network 240 by wire. In addition, the backhaul station 230 may be wirelessly connected to the plurality of base stations 211 and 212. In such the wireless backhaul system, the backhaul station 230 may divide an available capacity (CBL) according to required capacities (i.e., CAL1 and CAL2) of the base stations 211 and 212, and allocate a data channel resource to each of the base stations 211 and 212. In this case, the available capacity may be determined as a predetermined amount based on a frequency bandwidth used according to the radio channel state. In this manner, the backhaul station 230 may allocate a data channel resource of the backhaul link to each of the base stations 211 and 212.

Figure 3:
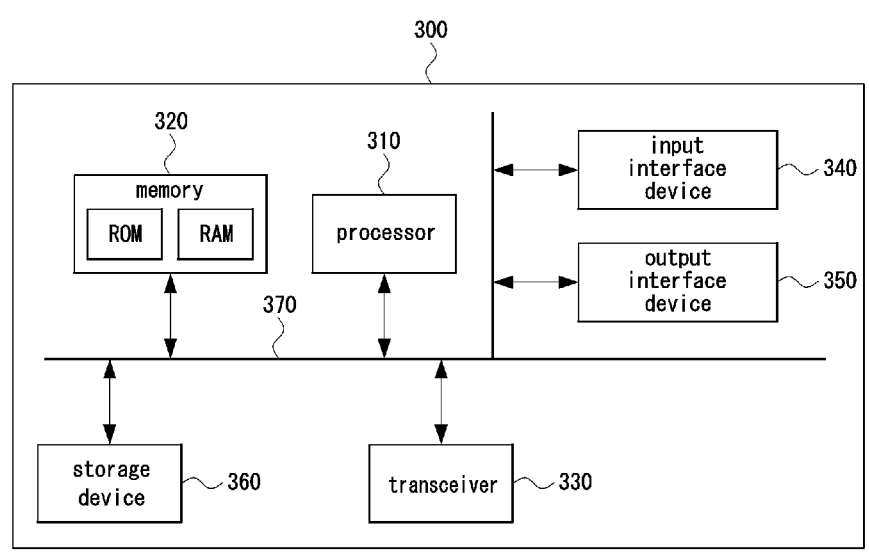
FIG. 3 is a block diagram illustrating a first exemplary embodiment of a communication node constituting a communication system.

FIG. 3 is a block diagram illustrating a first exemplary embodiment of a communication node constituting a communication system.

Referring to FIG. 3, a communication node 300, as the backhaul station or the base station, may comprise at least one processor 310, a memory 320, and a transceiver 330 connected to the network for performing communications. Also, the communication node 300 may further comprise an input interface device 340, an output interface device 350, a storage device 360, and the like. The respective components included in the communication node 300 may communicate with each other as connected through a bus 370. However, each component included in the communication node 300 may be connected to the processor 310 via an individual interface or a separate bus, rather than the common bus 370. For example, the processor 310 may be connected to at least one of the memory 320, the transceiver 330, the input interface device 340, the output interface device 350, and the storage device 360 via a dedicated interface.

The processor 310 may execute instructions stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may be constituted by at least one of a volatile storage medium and a non-volatile storage medium. For example, the memory 320 may comprise at least one of read-only memory (ROM) and random access memory (RAM).

Meanwhile, the wireless backhaul system may assign priorities to base stations using the backhaul link to ensure a capacity of an access base station when connecting from the backhaul link to the access link. Accordingly, a scheduling process of the wireless backhaul system may be as shown in FIG. 4 below.

Figure 4:
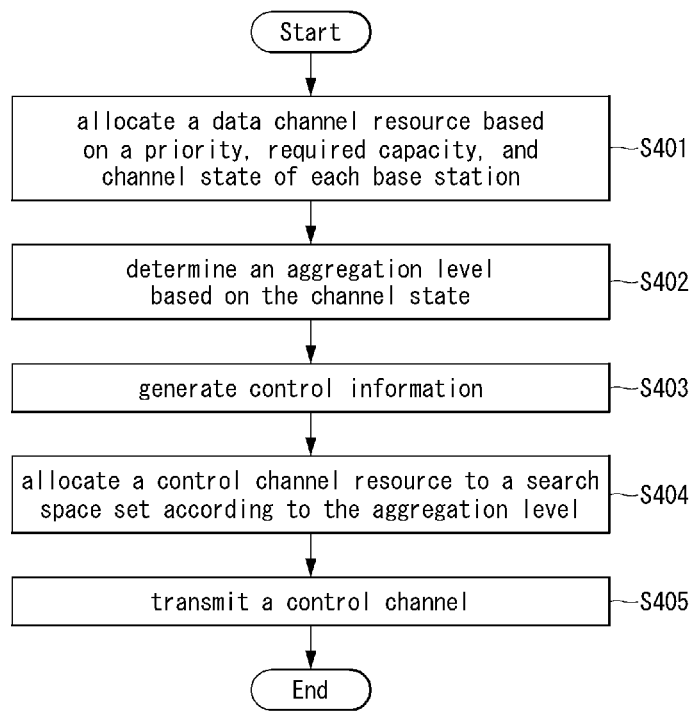
FIG. 4 is a flowchart illustrating a first exemplary embodiment of a scheduling method in a wireless backhaul system.

FIG. 4 is a flowchart illustrating a first exemplary embodiment of a scheduling method in a wireless backhaul system.

Referring to FIG. 4, the backhaul station of the wireless backhaul system may allocate a data channel resource to each base station in consideration of a priority of each base station, a required capacity of each base station, and a channel state between the backhaul station and each base station (S401). More specifically, each base station may request allocation of a data channel resource from the backhaul station. In this case, each base station may transmit, to the backhaul station, a required capacity required to provide communication services to terminals connected thereto. Then, the backhaul station may receive the data channel resource allocation request. In addition, the backhaul station may identify the required capacity of each base station.

Thereafter, the backhaul station may identify stored priorities of the base stations. In addition, the backhaul station may determine the channel state between the backhaul station and each base station. The backhaul station may receive a reference signal transmitted from each base station, measure a quality index of the received reference signal, and determine the channel state. Alternatively, in the wireless backhaul system, the backhaul station may transmit a reference signal to each base station, and each base station may receive the reference signal transmitted from the backhaul station and measure a quality index of the reference signal to determine the channel state. Each base station may transmit information on the identified channel state (i.e., channel state information) to the backhaul station. Accordingly, the backhaul station may receive the channel state information from each base station, and may determine the channel state based on the received channel state information.

Accordingly, the backhaul station may first allocate a data channel resource to a base station having the highest priority. In this case, the backhaul station may allocate a data channel resource corresponding to a required capacity of the corresponding base station. In this case, the backhaul station may allow the corresponding base station to sufficiently secure resources for supporting data communication of the access link. To this end, the backhaul station may allocate the data channel resource to the corresponding base station by using the available capacity. In this case, the backhaul station may determine the size of the data channel resource according to the channel state of the backhaul link (i.e., the channel state between the backhaul station and the corresponding base station) and the required capacity. More specifically, the backhaul station may allocate a resource corresponding to the required capacity of the base station having the highest priority from the available capacity as a reserved capacity for data channel. In addition, the backhaul station may adjust the reserved capacity according to the channel state, and allocate a resource corresponding to the adjusted reserved capacity as a data channel resource. In this case, the backhaul station may reduce the reserved capacity when the channel state is good, and allocate a resource corresponding to the reduced reserved capacity as a data channel resource. Alternatively, the backhaul station may increase the reserved capacity when the channel state is poor, and allocate a resource corresponding to the increased reserved capacity as a data channel resource.

In addition, the backhaul station may allocate a data channel resource corresponding to a required capacity of a base station having the next priority by using the remaining available capacity. In this case, the backhaul station may determine the size of the data channel resource according to the channel state of the backhaul link (i.e., the channel state between the backhaul station and the corresponding base station) and the required capacity. More specifically, the backhaul station may allocate a resource corresponding to the required capacity of the next priority base station from the available capacity as a reserved capacity for data channel. In addition, the backhaul station may adjust the reserved capacity according to the channel state, and allocate a resource corresponding to the adjusted reserved capacity as a data channel resource. In this case, the backhaul station may reduce the reserved capacity when the channel state is good, and allocate a resource corresponding to the reduced reserved capacity as a data channel resource. Alternatively, the backhaul station may increase the reserved capacity when the channel state is poor, and allocate a resource corresponding to the increased reserved capacity as a data channel resource.

In the NR communication system, the base station may transmit information (i.e., DCI) for demodulation of a data channel to the terminal by carrying it on a PDCCH. In this case, the base station may inform a size of an allocated resource for the PDCCH through a CCE aggregation level according to the channel state and the required reliability. Here, the CCE may be configured as resources (e.g. 6 REGs) of a certain size. In the wireless backhaul system, the backhaul station may configure a control channel using this scheme. The backhaul station may determine the size of allocated resource constituting one CCE according to the size of DCI to be transmitted to the supported base station, a type of coder-decoder (CODEC) to be used for the control channel, and a code rate of the CODEC.

Figure 5:
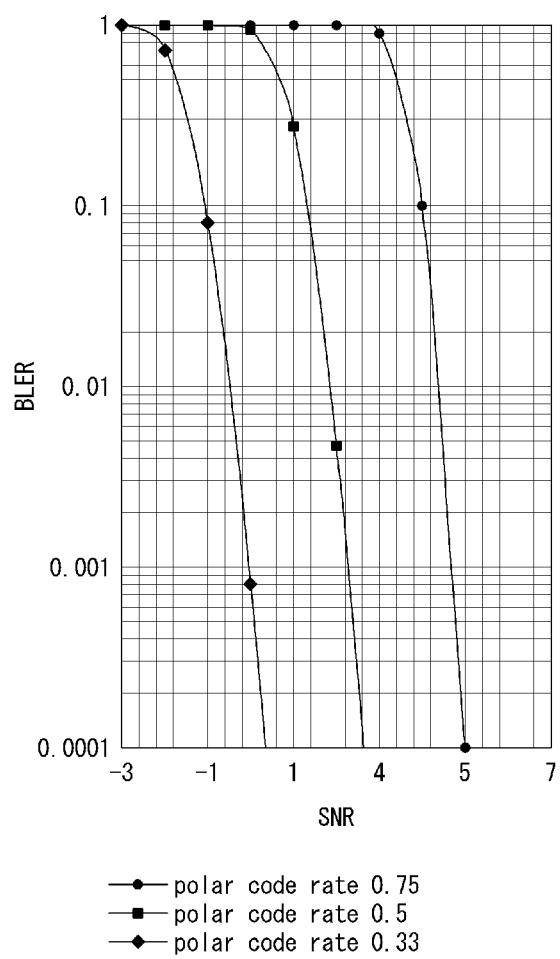
FIG. 5 is a graph illustrating a signal to noise ratio (SNR) and a block error rate (BLER) according to a polar code rate.

FIG. 5 is a graph illustrating a signal to noise ratio (SNR) and a block error rate (BLER) according to a polar code rate.

Referring to FIG. 5, it can be seen that the higher the polar code rate, the better the SNR and BLER. Further, a CCE aggregation level may be inversely proportional to the SNR and the BLER. Accordingly, the backhaul station may lower the CCE aggregation level when the polar code rate is high. Accordingly, the backhaul station of the wireless backhaul system may determine a basic CCE aggregation level for configuring one PDCCH according to the channel state. In addition, when the backhaul station increases resources for a PDCCH through CCE aggregation, it may be possible to secure performance by lowering the code rate of the corresponding channel.

As the CCE aggregation level increases, reliability may be increased, and the CCE aggregation level may be adjusted according to the channel state. In the wireless backhaul system, the backhaul station may determine the channel state between the backhaul station and each base station. The backhaul station may configure a downlink control channel for each base station with the CCE aggregation level of 1 or 2 when the channel state of the backhaul link is good. Alternatively, the backhaul station may configure a downlink control channel for each base station with the aggregation level of 4, 8, or 16 when the channel state of the backhaul link is not good. Meanwhile, the backhaul station may set the basic CCE aggregation level to 1 or 2. In addition, the backhaul station may increase the size of allocated resource as the CCE aggregation level increases.

Meanwhile, the backhaul station may allocate a data channel resource to support a required capacity of one base station in consideration of the channel state. The backhaul station of such the wireless backhaul system may allocate a control channel resource and a data channel resource to each base station in consideration of the channel state and a required resource according to the required capacity of each base station.

The backhaul station may configure a PDCCH with CCEs having the CCE aggregation level of 1 or 2 when the channel state between the backhaul station and the corresponding base station is good. The backhaul station may support data channel transmission using a high modulation and coding scheme (MCS) when the channel state is good. Accordingly, the backhaul station may satisfy the required capacity with allocation of a small data channel resource. As such, the backhaul station may allocate a data channel resource to the corresponding base station. In addition, since the backhaul station can support other base stations, it may support a plurality of different base stations.

On the other hand, the backhaul station may configure a PDCCH with CCEs having the aggregation level of 4 to 8 when the channel state between the backhaul station and the corresponding base station is poor. The backhaul station may support data channel transmission by using a low MCS when the channel state is poor. As a result, the backhaul station may satisfy the required capacity with allocation of a large data channel resource. Accordingly, it may be difficult for the backhaul station to support another base station after allocating the data channel resource to the corresponding base station. Accordingly, the backhaul station may support a small number of base stations by using the predetermined available capacity.

As described above, the backhaul station may utilize the CCE aggregation level as implicit information because the CCE aggregation level is related to the MCS information. Accordingly, the backhaul station may provide information on the CCE aggregation levels and MCS indexes as shown in Table 2, which are information for demodulating the data channel, to each base station.

Referring to Table 2, the index of MCS indicated when the CCE aggregation level is 8 may be 0 to 6, the index of MCS indicated when the CCE aggregation level is 4 may be 7 to 13, the index of MCS indicated when the CCE aggregation level is 2 may be 14 to 20, and the index of MCS indicated when the CCE aggregation level is 1 may be 21 to 27. Accordingly, the base station may determine the CCE aggregation level by receiving the control channel transmitted from the backhaul station. In addition, the base station may identify the range of the indicated MCS index according to the identified aggregation level.

Referring to Table 2, a modulation order corresponding to the case where the CCE aggregation level is 8 may be q or 2, a modulation order corresponding to the case where the CCE aggregation level is 4 may be 2 or 4, a modulation order corresponding to the case where the CCE aggregation level is 2 may be 4 or 6, and a modulation order corresponding to the case where the CCE aggregation level is 1 may be 6. Accordingly, the base station may identify the CCE aggregation level by receiving the control channel transmitted from the backhaul station. Further, the base station may identify the modulation order according to the identified aggregation level.

TABLE 2

| CCE aggregation level | MCS index ($I_{MCS}$) | Modulation order (Qm) | Target code rate (R × 1024) | Spectral efficiency |
|---|---|---|---|---|
| 8 | 0 | q | 240/q | 0.2344 |
| 8 | 1 | q | 314/q | 0.3066 |
| 8 | 2 | 2 | 193 | 0.3770 |
| 8 | 3 | 2 | 251 | 0.4902 |
| 8 | 4 | 2 | 308 | 0.6016 |
| 8 | 5 | 2 | 379 | 0.7402 |
| 8 | 6 | 2 | 449 | 0.8770 |
| 4 | 7 | 2 | 526 | 1.0273 |
| 4 | 8 | 2 | 602 | 1.1758 |
| 4 | 9 | 2 | 679 | 1.3262 |
| 4 | 10 | 4 | 340 | 1.3281 |
| 4 | 11 | 4 | 378 | 1.4766 |
| 4 | 12 | 4 | 434 | 1.6953 |
| 4 | 13 | 4 | 490 | 1.9141 |
| 2 | 14 | 4 | 553 | 2.1602 |
| 2 | 15 | 4 | 616 | 2.4063 |
| 2 | 16 | 4 | 658 | 2.5703 |
| 2 | 17 | 6 | 466 | 2.7305 |

TABLE 2-continued

| CCE aggregation level | MCS index ($I_{MCS}$) | Modulation order (Qm) | Target code rate (R × 1024) | Spectral efficiency |
|---|---|---|---|---|
| 2 | 18 | 6 | 517 | 3.0293 |
| 2 | 19 | 6 | 567 | 3.3223 |
| 2 | 20 | 6 | 616 | 3.6094 |
| 1 | 21 | 6 | 666 | 3.9023 |
| 1 | 22 | 6 | 719 | 4.2129 |
| 1 | 23 | 6 | 772 | 4.5234 |
| 1 | 24 | 6 | 822 | 4.8164 |
| 1 | 25 | 6 | 873 | 5.1152 |
| 1 | 26 | 6 | 910 | 5.3320 |
| 1 | 27 | 6 | 948 | 5.5547 |
| 8 | 28 | q | reserved | |
| 4 | 29 | 2 | reserved | |
| 2 | 30 | 4 | reserved | |
| 1 | 31 | 6 | reserved | |

Meanwhile, the backhaul station may use the CCE aggregation level to represent 2 bits of the most significant bits (MSBs) of the MCS index. To this end, the backhaul station may set a shortened MCS index as shown in Table 3 when each CCE aggregation level is used to represent the most significant 2 bits for each MCS index. In addition, the backhaul station may provide information on the corresponding shortened MCS index to the base station for each MCS index.

TABLE 3

| CCE aggregation level | Shortened MCS index | MCS index ($I_{MCS}$) | Modulation order (Qm) | Target code rate (R × 1024) | Spectral efficiency |
|---|---|---|---|---|---|
| 8 | 0 | 0 | q | 240/q | 0.2344 |
| 8 | 1 | 1 | q | 314/q | 0.3066 |
| 8 | 2 | 2 | 2 | 193 | 0.3770 |
| 8 | 3 | 3 | 2 | 251 | 0.4902 |
| 8 | 4 | 4 | 2 | 308 | 0.6016 |
| 8 | 5 | 5 | 2 | 379 | 0.7402 |
| 8 | 6 | 6 | 2 | 449 | 0.8770 |
| 4 | 0 | 7 | 2 | 526 | 1.0273 |
| 4 | 1 | 8 | 2 | 602 | 1.1758 |
| 4 | 2 | 9 | 2 | 679 | 1.3262 |
| 4 | 3 | 10 | 4 | 340 | 1.3281 |
| 4 | 4 | 11 | 4 | 378 | 1.4766 |
| 4 | 5 | 12 | 4 | 434 | 1.6953 |
| 4 | 6 | 13 | 4 | 490 | 1.9141 |
| 2 | 0 | 14 | 4 | 553 | 2.1602 |
| 2 | 1 | 15 | 4 | 616 | 2.4063 |
| 2 | 2 | 16 | 4 | 658 | 2.5703 |
| 2 | 3 | 17 | 6 | 466 | 2.7305 |
| 2 | 4 | 18 | 6 | 517 | 3.0293 |
| 2 | 5 | 19 | 6 | 567 | 3.3223 |
| 2 | 6 | 20 | 6 | 616 | 3.6094 |
| 1 | 0 | 21 | 6 | 666 | 3.9023 |
| 1 | 1 | 22 | 6 | 719 | 4.2129 |
| 1 | 2 | 23 | 6 | 772 | 4.5234 |
| 1 | 3 | 24 | 6 | 822 | 4.8164 |
| 1 | 4 | 25 | 6 | 873 | 5.1152 |
| 1 | 5 | 26 | 6 | 910 | 5.3320 |
| 1 | 6 | 27 | 6 | 948 | 5.5547 |
| 8 | 7 | 28 | q | reserved | |
| 4 | 7 | 29 | 2 | reserved | |
| 2 | 7 | 30 | 4 | reserved | |
| 1 | 7 | 31 | 6 | reserved | |

Thereafter, the backhaul station may configure information for demodulation of the data channel, which includes the shortened MCS index, and transmit it to the base station. As an example, when the backhaul station intends to deliver the MCS index 7 to the base station, referring to Table 3, the aggregation level may be set to 2, and the shortened MCS index may be set to 0. In addition, the backhaul station may configure information for demodulation of the data channel, which includes the shortened MCS index 0, and provide it to the base station on a control channel.

Accordingly, the base station may receive the information for demodulation of the data channel, which includes the shortened MCS index 0, through the CCE aggregation level 2 on the control channel. In this case, the base station may identify that the CCE aggregation level is 2. In addition, the base station may identify the shortened MCS index 0 from the information for demodulation of the data channel. In this manner, the base station may identify that the CCE aggregation level of the control channel received through the blind decoding process is 2, and may identify that the shortened MCS index included in the resource allocation information is 0. Then, the base station may determine that the MCS index is 7 with reference to Table 3.

Referring again to FIG. 4, the backhaul station may determine the CCE aggregation level for the PDCCH based on the channel state of each base station (S402). In this case, the backhaul station may set the number of CCEs for the PDCCH according to the channel state in proportion to the size of the data channel resource allocated according to the required capacity. The wireless backhaul system may satisfy the required capacity of the base station by using a small data channel resource when the radio channel state is good. In this case, the backhaul system may support a downlink control channel resource by using a low CCE aggregation level to satisfy reliability.

In this case, the backhaul station may first support a base station of the highest priority. In addition, the backhaul station may support a data channel for a base station of the next priority if there is room in data channel resources. The backhaul station may allocate control channel channels to base stations in the order of priority. In this case, the backhaul station may support one base station with all control channels of one carrier when the channel state is poor. Alternatively, the backhaul station may allocate remaining CCEs within a search space for PDCCHs to support the base station having the next priority when the channel state is good. On the other hand, the backhaul system may support a small number of base stations when the channel state is not good, and may support a plurality of base stations in consideration of the channel state according to the required capacities.

For example, there may be three base stations A, B, and C using the backhaul link. In this case, the priorities thereof may be configured as 'base station A>base station B>base station C'. Then, the backhaul station may first allocate a resource to the base station A according to the required capacities of the base stations A, B, and C, and then allocate remaining resources to the base stations B and C in the order of their priorities. In this case, the backhaul station may set the size of the control channel resource to a predetermined number of CCEs. For example, the predetermined number may be 16 CCEs.

Meanwhile, the channel state of the base station A may be better than the channel state of the base station B. Then, since a CCE aggregation level is in inverse proportion to the channel state, a CCE aggregation level used by the backhaul station to transmit a PDCCH for the base station A may be lower than a CCE aggregation level used to transmit a PDCCH for the base station B. Accordingly, the number of CCEs used by the backhaul station to transmit the PDCCH for the base station A may be smaller than the number of CCEs used to transmit the PDCCH for the base station B.

In this case, the backhaul station may allocate all available data channel resources to satisfy the capacity requirements of the base station A and the base station B. As a result, there may not be any resources remaining to be allocated by the backhaul station for the base station C at a corresponding scheduling time. In this case, the backhaul station may allocate a data channel resource for the base station C at the next scheduling time. In this case, it may be assumed that the required capacity of each base station is the same. As shown in FIGS. 6 to 10, the backhaul station may support a large amount of available capacity for the base station B by using less resources for the control channel and the data channel for the base station A.

Figure 6:
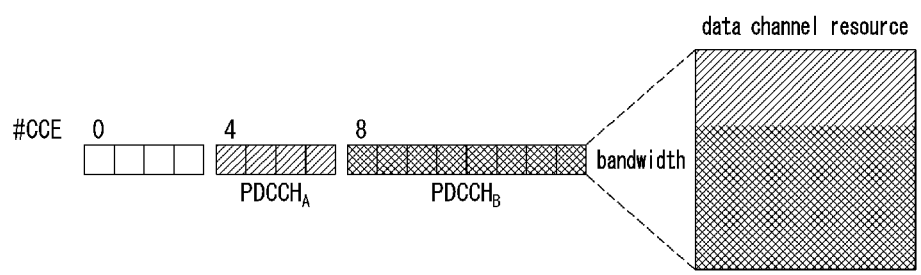
FIG. 6 is a conceptual diagram illustrating a first exemplary embodiment illustrating a control channel resource associated with a data channel resource.

FIG. 6 is a conceptual diagram illustrating a first exemplary embodiment illustrating a control channel resource associated with a data channel resource.

Referring to FIG. 6, the backhaul station may set the size of the control channel resource to a predetermined number of CCEs, that is, 16 CCEs. In this case, the backhaul station may allocate ⅓ of the available capacity for the data channel of the base station A, and may allocate ⅔ of the available capacity for the data channel of the base station B. Accordingly, the backhaul station may allocate 4 CCEs (i.e., ⅓ of the size of the control channel region) for the control channel (i.e., $PDCCH_A$) of the base station A, and allocate 8 CCEs (i.e., ⅔ of the size of the control channel region) for the control channel (i.e., $PDCCH_B$) of the base station B.

Figure 7:
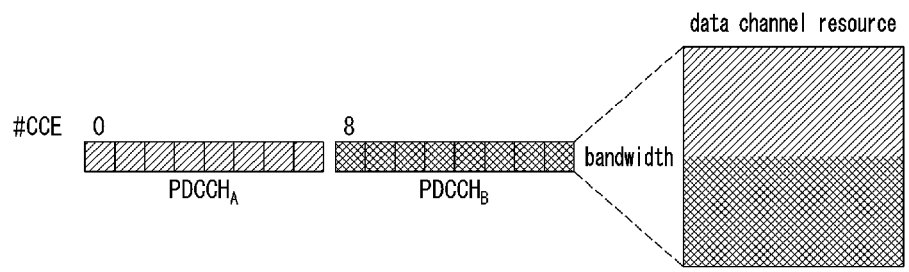
FIG. 7 is a conceptual diagram illustrating a second exemplary embodiment illustrating a control channel resource associated with a data channel resource.

FIG. 7 is a conceptual diagram illustrating a second exemplary embodiment illustrating a control channel resource associated with a data channel resource.

Referring to FIG. 7, the backhaul station may set the size of the control channel resource to a predetermined number of CCEs, that is, 16 CCEs. In this case, the channel states of the base station A and the base station B may be similar. Accordingly, the backhaul station may allocate ½ of the available capacity for the data channel of the base station A, and may allocate ½ of the available capacity for the data channel of the base station B. Then, the backhaul station may allocate 8 CCEs (i.e., ½ of the size of the control channel region) for the control channel (i.e., $PDCCH_A$) of the base station A, and allocate 8 CCEs (i.e., ½ of the size of the control channel region) for the control channel (i.e., $PDCCH_B$) of the base station B.

Figure 8:
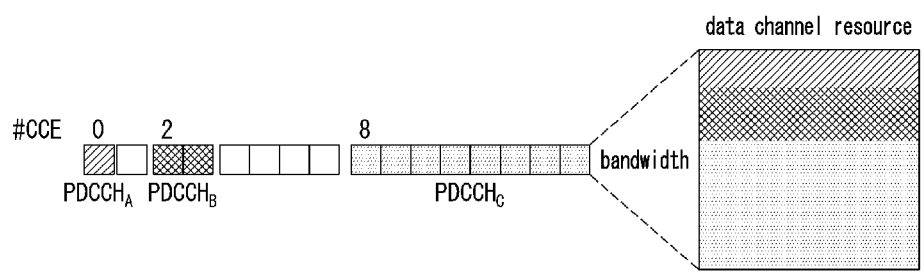
FIG. 8 is a conceptual diagram illustrating a third exemplary embodiment illustrating a control channel resource associated with a data channel resource.

FIG. 8 is a conceptual diagram illustrating a third exemplary embodiment illustrating a control channel resource associated with a data channel resource.

Referring to FIG. 8, the backhaul station may set the size of the control channel resource to a predetermined number of CCEs, that is, 16 CCEs. In this case, the channel states of the base station A and the base station B may be good. Accordingly, the backhaul station may allocate 1/11 of the available capacity for the data channel of the base station A, and may allocate 2/11 thereof for the data channel of the base station B.

In this case, since there is a room in data channel resources, the backhaul station may allocate 8/11 of the available capacity for the data channel resource for the base station C. Then, the backhaul station may allocate 1 CCE (i.e., 1/11 of the size of the control channel region) for the control channel (i.e., $PDCCH_A$) of the base station A, allocate 2 CCEs (i.e., 2/11 of the size of the control channel region) for the control channel (i.e., $PDCCH_B$) of the base station B, and allocate 8 CCEs (i.e., 8/11 of the size of the control channel region) for the control channel (i.e., $PDCCH_A$) of the base station C.

Figure 9:
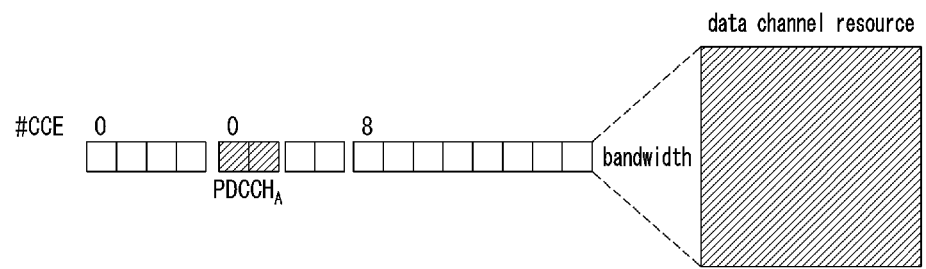
FIG. 9 is a conceptual diagram illustrating a fourth exemplary embodiment illustrating a control channel resource associated with a data channel resource.

FIG. 9 is a conceptual diagram illustrating a fourth exemplary embodiment illustrating a control channel resource associated with a data channel resource.

Referring to FIG. 9, the backhaul station may set the size of the control channel resource to a predetermined number of CCEs, that is, 16 CCEs. In this case, the required capacity of the base station A may be substantially equal to the available capacity. Accordingly, the backhaul station may allocate all available capacity for the base station A. In addition, the backhaul station may allocate 2 CCEs for the control channel of the base station A (i.e., $PDCCH_A$) in the control channel region.

Figure 10:
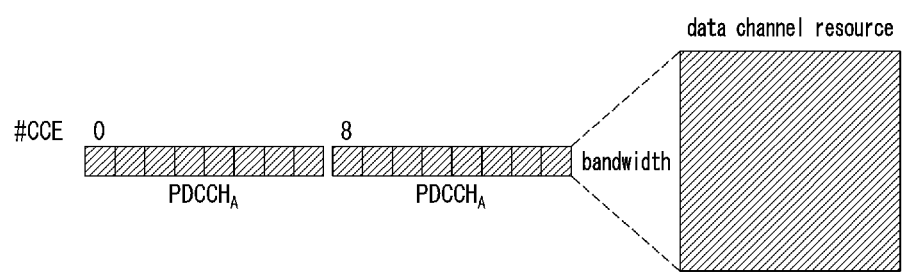
FIG. 10 is a conceptual diagram illustrating a fifth exemplary embodiment illustrating a control channel resource associated with a data channel resource.

FIG. 10 is a conceptual diagram illustrating a fifth exemplary embodiment illustrating a control channel resource associated with a data channel resource.

Referring to FIG. 10, the backhaul station may set the size of the control channel resource to a predetermined number of CCEs, that is, 16 CCEs. In this case, the channel state of the base station A may not be good. Accordingly, the backhaul station may allocate all available capacity for the base station A. In addition, the backhaul station may redundantly allocate 8 CCEs for the control channel (i.e., $PDCCH_A$) of the base station A in the control channel region. As described above, the backhaul station may repeatedly transmit the control channel having a high aggregation level in order to increase the reliability of the control channel when the channel state is poor.

In this case, the backhaul station may use all control channel resources to transmit a control channel(s) to one or a few base stations. In this case, the base station may receive the control channel repeatedly transmitted at the same aggregation level. The base station may recover control information by individually using the receive data channels or using the received data channels in combination. Accordingly, the base station may achieve a combining gain. The CCE aggregation level of the PDCCH for the base station may be configured as shown in Table 4. The 8+8 aggregation level may reduce the complexity according to the code rate to be considered in a CODEC structure required in the existing CCE aggregation level 16.

TABLE 4

| CCE aggregation level | The number of CCEs |
| --- | --- |
| 1 | 1 |
| 2 | 2 |
| 4 | 4 |
| 8 | 8 |
| 8 + 8 | 16 |

In this regard, the backhaul station may provide the base station with information on the CCE aggregation level and the resource allocation information. In addition, the backhaul station may determine the aggregation level by using the information related to the aggregation level and the resource allocation information.

Referring again to FIG. 4, the backhaul station may generate control information using the determined CCE aggregation level and resource allocation information of the data channel (S403). In addition, the backhaul station may allocate a control channel resource to a candidate search space according to the determined CCE aggregation level in order to transmit the generated control information to the base station (S404). Thereafter, the backhaul station may transmit the control information to the base station by using the allocated control channel resource (S405). Accordingly, the base station may receive the control information and may obtain the control information.

As described above, the backhaul station may perform scheduling by determining the number of base stations supported in each slot according to a criterion for securing capacity for base stations having priority among N base stations.

Figure 11:
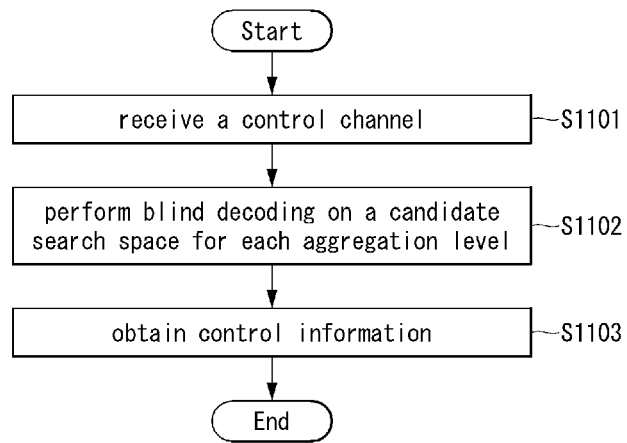
FIG. 11 is a flowchart illustrating a first exemplary embodiment of a method for obtaining control information of a base station.

FIG. 11 is a flowchart illustrating a first exemplary embodiment of a method for obtaining control information of a base station.

Referring to FIG. 11, the backhaul station may allocate a data channel resource for each base station from the available capacity in consideration of a priority, required capacity, and channel state of each base station. In addition, the backhaul station may determine a CCE aggregation level for a PDCCH of each base station in consideration of the channel state of each base station. Thereafter, the backhaul station may allocate a control channel resource to a candidate search space according to the determined CCE aggregation level in order to transmit control information to the base station.

Subsequently, the backhaul station may transmit the control information to the base station by using the allocated control channel resource. Then, the base station may receive the control channel (S1101). The base station may perform blind decoding on the candidate search space for each CCE aggregation level (S1102), and may obtain the control information by detecting the PDCCH corresponding to the base station. Accordingly, the base station may obtain resource allocation information of a data channel of the backhaul station according to the required capacity based on the control information.

The base station may perform scheduling of a data channel for a terminal based on the resource allocation information of the data channel of the backhaul station. Meanwhile, the backhaul station may use the CCE aggregation level to represent the most significant 2 bits of an MCS index. To this end, the backhaul station may set a shortened MCS index when the most significant 2 bits of the MCS index to be transmitted to the base station are set as the CCE aggregation level with reference to Table 3. In addition, the backhaul station may transmit, to the base station, information for demodulation of the data channel including the shortened MCS index on a control channel.

Accordingly, the base station may receive information for demodulation of the data channel including the shortened MCS index from the backhaul station, and may obtain the shortened MCS index from the received information. Then, the backhaul station may calculate and use the MCS index by using the obtained shortened MCS index and Table 3.

For example, when the backhaul station intends to deliver the MCS index 7 to the base station on the control channel, referring to Table 3, the CCE aggregation level may be set to 2, and the shortened MCS index may be set to 0. Then, the base station may receive the resource allocation information including the shortened MCS index 0 indicating the CCE aggregation level 2 on the control channel. Accordingly, the base station may identify that the CCE aggregation level of the received control channel is 2 and that the shortened MCS index is 0 through a blind decoding process. In this case, the base station may determine that the MCS index is 7 with reference to Table 3.

Meanwhile, in the case of the NR system, in a control channel resource space of a predetermined size, each terminal may decode a control channel in a candidate search space without knowing the number of CCEs constituting the PDCCH (i.e., CCE aggregation level). In this case, when the terminal performs blind decoding, up to 44 processes may be performed according to a subcarrier spacing.

Meanwhile, in the wireless backhaul system, the candidate search space of each CCE aggregation level may not be wide due to a limited control channel resource space. In addition, a difference in capacities of the backhaul link and the access link supported by one control channel in the wireless backhaul system may not be large. In addition, in the wireless backhaul system, it may be difficult to apply the highest MCS to a basic data channel resource as a capacity supportable by the access link due to a channel influence of the wireless backhaul link.

Accordingly, the wireless backhaul system may not need to secure control channel resources for multiple base stations. In addition, the wireless backhaul system may configure a control channel resource space as a limited period. Accordingly, the wireless backhaul system may reduce the number of blind decoding processes according to the CCE aggregation level used for control channels.

In addition, the wireless backhaul system may not vary a payload size according to the types of DCI to be distinguished. As a result, the wireless backhaul system may reduce the number of blind decoding processes. In this manner, the base station may adjust the range of the CCE aggregation levels by using the information fed back to the backhaul station. Accordingly, the base station may improve resource efficiency by performing blind decoding within the range of the CCE aggregation levels. In this case, after the base station reports the channel state to the backhaul station, the base station may use information of the corresponding channel.

Figure 12:
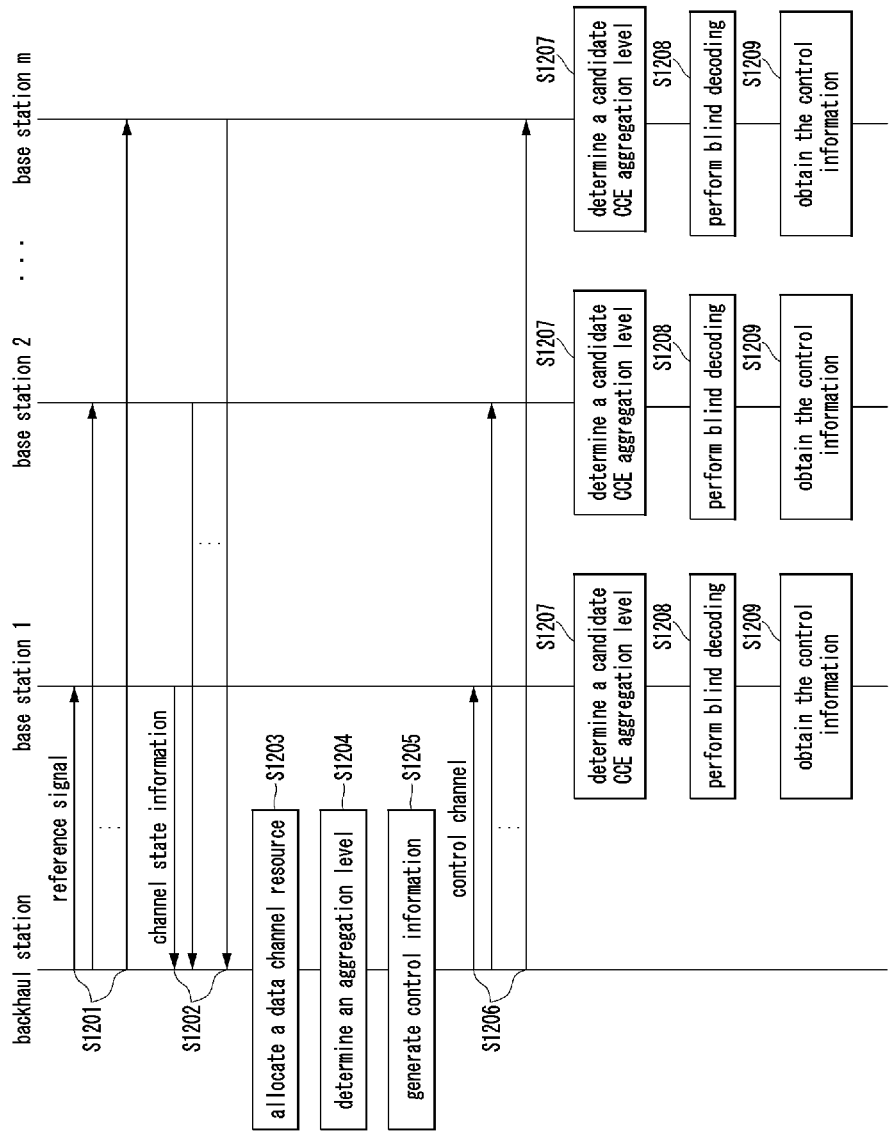
FIG. 12 is a flowchart illustrating a second exemplary embodiment of a scheduling method in a wireless backhaul system.

FIG. 12 is a flowchart illustrating a second exemplary embodiment of a scheduling method in a wireless backhaul system.

Referring to FIG. 12, in the wireless backhaul system, the backhaul station may transmit a reference signal to each base station (i.e., base stations 1, 2, ..., and m, where m is a natural number) (S1201). Then, each base station may receive the reference signal transmitted from the backhaul station. Accordingly, each base station may determine a channel state by measuring a quality index of the reference signal. Each base station may transmit information on the identified channel state (i.e., channel state information) to the backhaul station (S1202). Accordingly, the backhaul station may receive the channel state information from each base station, and may identify the channel state from the received channel state information.

Meanwhile, the backhaul station may allocate a data channel resource to each base station in consideration of a priority of each base station, a required capacity of each base station, and the channel state between the backhaul station and each base station (S1203). Then, the backhaul station may determine a CCE aggregation level based on MCS or SNR measurement by using the channel state information reported from each base station (S1204). In this manner, the backhaul station may determine the CCE aggregation level based on the channel state information.

In this case, the base station may limit the number of CCE aggregation levels to be searched by configuring a candidate CCE aggregation level set as shown in Table 5 below. In this case, the MCS of the data channel may have a lower modulation order and a lower code rate as the channel state is poor. As a result, the CCE aggregation level may be increased for the control channel.

TABLE 5

| MCS index sections | Candidate CCE aggregation level set |
| --- | --- |
| 27~21 | 1, 2 |
| 20~14 | 2, 4 |

TABLE 5-continued

| MCS index sections | Candidate CCE aggregation level set |
| --- | --- |
| 13~7 | 4, 8 |
| 6~2 | 8, 8 + 8 |
| 1~0 | 8 + 8 |

Accordingly, the backhaul station may divide the MCS indexes into a plurality of sections by reflecting the channel state as shown in Table 5 in order to transmit resource allocation information to the base station. In addition, the backhaul station may allocate candidate CCE aggregation levels to each MCS index section as shown in Table 5. Of course, the backhaul station may provide the base station with information on MCS indexes included in each MCS index section and information on candidate CCE aggregation levels allocated to each MCS index section in advance.

In addition, the backhaul station may calculate an MCS index based on the channel state of the base station, and may select one CCE aggregation level from the candidate CCE aggregation levels of the MCS index section including the calculated MCS index. Thereafter, the backhaul station may generate control information using the determined CCE aggregation level and resource allocation of the data channel (S1205). In addition, the backhaul station may allocate a control channel resource to a candidate search space according to the determined CCE aggregation level in order to transmit the generated control information to the base station. Then, the backhaul station may transmit a message including the control information to the base station on a control channel by using the allocated control channel resource (S1206).

Meanwhile, each base station may receive the reference signal transmitted from the backhaul station in step S1202 and measure a quality index of the reference signal to identify a channel state. In addition, each base station may receive, from the backhaul station, the information in Table 5, that is, information on the MCS index sections and candidate CCE aggregation level sets corresponding to the respective MCS index sections, and store the information. Accordingly, each base station may determine a candidate CCE aggregation level by using the information (S1207). Then, each base station may perform blind decoding on a candidate search space for each CCE candidate aggregation level (S1208).

Accordingly, each base station may obtain the control information by detecting the PDCCH corresponding to each base station (S1209). As a result, each base station may obtain resource allocation information of a data channel of the backhaul station according to the required capacity based on the control information. Each base station may perform scheduling of a data channel for a terminal based on the resource allocation information of the data channel of the backhaul station.

As such, the base station may not need to perform the blind decoding process on candidate search spaces of all CCE aggregation levels, when performing blind decoding for a PDCCH based on the channel state information. The base station may perform a blind decoding process for the candidate CCE aggregation level combination according to the channel state information.

Meanwhile, in the CCE aggregation level of 8+8, 16 CCEs are used by combining two groups of 8 CCEs. Accordingly, the backhaul station may continuously transmit the same information using 8 CCEs. Then, the base station may perform a decoding process by combining the information of the two groups of CCEs that are continuously transmitted.

Figure 13:
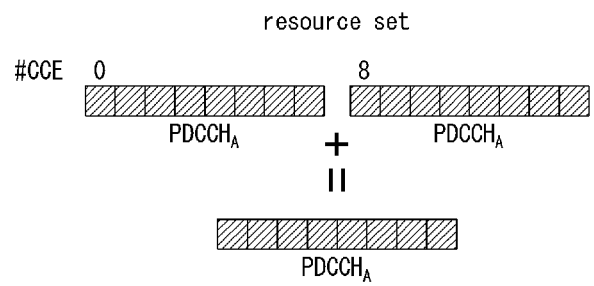
FIG. 13 is a conceptual diagram illustrating a first exemplary embodiment of redundant allocation of control channel resources.

FIG. 13 is a conceptual diagram illustrating a first exemplary embodiment of redundant allocation of control channel resources.

Referring to FIG. 13, the backhaul system may redundantly allocate control channel resources of 8 CCEs for a PDCCH for the base station A. In addition, the backhaul system may continuously transmit the PDCCH to the base station A through the control channel of 8 CCEs allocated redundantly. Accordingly, the base station A may repeatedly receive the PDCCH continuously transmitted from the backhaul station.

Then, the base station A may perform a decoding process by combining the repeatedly received PDCCHs. As such, as the base station performs a decoding process by combining repeatedly received PDCCHs, a performance gain may be obtained. As such, the backhaul system may increase reliability by configuring the CCE aggregation level as 8+8.

Meanwhile, the backhaul station may determine the size of the control channel resource space in consideration of the data channel resource. The backhaul station may perform low-latency scheduling using support of a small number of base stations and a short slot structure in consideration of the backhaul link. Accordingly, the backhaul station may determine the number of simultaneously supported base stations in consideration of the available capacity according to a bandwidth and required capacities of the base stations. In this case, the backhaul station may support a small number of base stations when a difference in capacities of the backhaul link and the access link connected thereto, which are supported by one carrier, is not large.

Meanwhile, the backhaul station may use a resource block group (RBG) as a unit for identifying a data channel resource and a minimum unit supporting one base station. The backhaul station may secure a control channel space based on the minimum CCE aggregation level 1 supporting PDCCHs as many as the number of RBGs. Accordingly, the backhaul station may transmit, to the base station, resource allocation information of a data channel, which is configured in units of RBGs, in control information of a PDCCH.

For example, the number of resource blocks within one carrier may be M. In addition, it may be assumed that the number of resource blocks required to support the required capacity of the base station is K when calculated based on the MCS, which is a channel state greater than or equal to a certain reference (which can be supported by the CCE aggregation level 1 when transmitting control channel information). In this case, the backhaul station may set the size of the RBG to K resource blocks. In this case, the backhaul station may set the number of RBGs constituting one carrier to N=M/K, so that the maximum number of base stations that can be supported by one carrier is N.

In this case, the backhaul station may further need to secure resources for lowering a code rate according to the channel state of each base station. In this case, the backhaul station may support the data channel resource of the corresponding base station by increasing the number of RBGs. In this case, the CCE aggregation level, which is the control channel resource of the corresponding base station, may also increase. Accordingly, the backhaul station may configure the control channel resource space based on the maximum number N of supported base stations. The backhaul station may support using multiple carriers when the required capacity of the corresponding access link is larger than the backhaul link supported by one carrier.

Here, the backhaul station may not set the size of the basic RBG based on the number of RBs for supporting one base station. In addition, the backhaul station may set the size of the basic RBG as K1 RBs. As such, the backhaul station may use the size of the basic RBG as K1 RBs as a resource allocation unit when supporting the base station. In this case, the backhaul station may configure the control channel resource space in consideration of the available capacity supported by the RBG of the MCS or higher and the required capacity of the base station in consideration of the basic RBG size K1. In this case, the maximum number N of supported base stations may be M/(K1×R) when the number of RBGs required for base station support is R. The backhaul station may adjust the number of supported base stations according to the channel state.

In this case, the CCE aggregation level of each base station may be increased as the channel state deteriorates. The backhaul station may transmit the control channel by using the resource size in accordance therewith. The backhaul station may determine a data capacity for one carrier by applying a reference MCS. In addition, the backhaul station may also set the size of the resource region for the control channel to be constant. In this structure, the allocation size of the data channel may be set in conjunction with the control channel transmission CCE aggregation level according to the channel state of the base station supporting the communication service. Accordingly, the backhaul station may increase resource efficiency by setting the size of the control channel region in proportion to the available capacity supported by the data channel.

Meanwhile, the backhaul station may terminate concurrent support scheduling when all resources of the configured control channel region are allocated. Alternatively, the backhaul station may terminate concurrent support scheduling when all resources of the configured data channel region are allocated.

Figure 14:
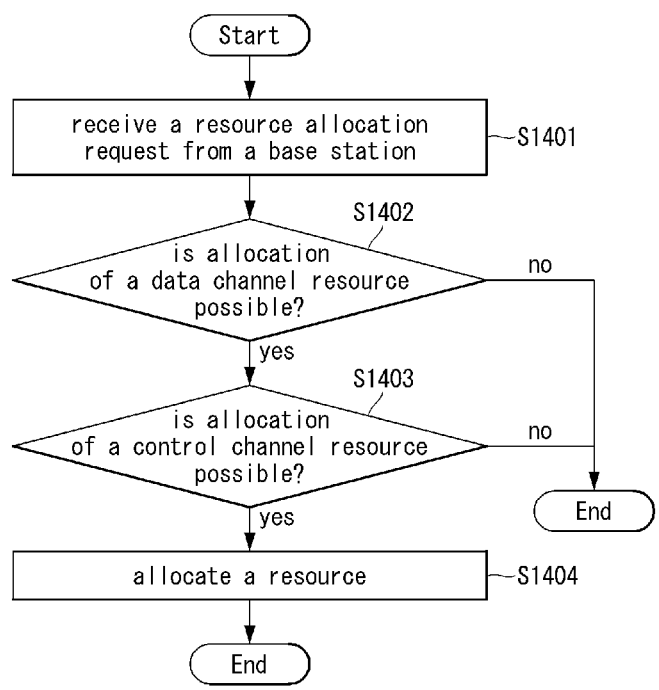
FIG. 14 is a flowchart illustrating a third exemplary embodiment of a scheduling method in a wireless backhaul system.

FIG. 14 is a flowchart illustrating a third exemplary embodiment of a scheduling method in a wireless backhaul system.

Referring to FIG. 14, in the scheduling method, the base station may request resource allocation from the backhaul station. In this case, the base station may inform the backhaul station of a required capacity required to provide communication services to connected terminals. Then, the backhaul station may receive the resource allocation request including the required capacity from the base station (S1401).

In this case, the backhaul station may allocate a data channel resource to the base station from an available capacity in consideration of a priority, required capacity, and channel state of the base station. To this end, the backhaul station may first determine whether a resource can be allocated for a data channel of the base station from the available capacity (S1402).

As a result of the determination, if the backhaul station cannot allocate a resource for the data channel of the base station from the available capacity, the backhaul station may terminate scheduling. Here, the case in which the data channel cannot be allocated from the available capacity may be a case in which all available capacity has already been allocated to base stations of a higher priority. Alternatively, if the backhaul station can allocate a data channel resource for the base station from the available capacity, the backhaul station may determine whether it can allocate a control channel resource for the base station (S1403).

In this case, the backhaul station may terminate scheduling if the backhaul station cannot allocate a control channel resource for the base station. Alternatively, if it is determined that the backhaul station can allocate a control channel resource for the base station, it may finally perform resource allocation for the data channel and resource allocation for the control channel (S1404). Here, the case in which a control channel resource cannot be allocated for the base station may be a case in which all control channel resources are allocated for other base stations. In addition, the case in which a control channel resource cannot be allocated for the base station may be a case in which a control channel resource for allocating a PDCCH to an interval position of the CCE aggregation level cannot be allocated.

On the other hand, a subcarrier spacing of the backhaul link using the wideband of the ultra-high frequency band may be larger than that of the existing NR system in consideration of the frequency band characteristics. Accordingly, the symbol length may be shortened compared to the existing NR system. As a result, the wireless backhaul system may reduce a delay time due to the scheduling scheme in the existing frequency band. This configuration may be different from the existing multi-terminal support scheduling method. Accordingly, the wireless backhaul system may support a plurality of terminals with a short delay time by using the next slot even when the number of terminals supported in one slot is small. Such the configuration may be applicable to a communication system for securing capacity in addition to the backhaul system.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a backhaul station in a wireless backhaul system, the operation method comprising:
   receiving, from a base station, information on a required capacity of a data channel resource;
   identifying a channel state of the base station;
   allocating a first resource corresponding to the required capacity from an available capacity as a reserved capacity for the data channel resource;
   adjusting the reserved capacity according to the channel state;
   allocating a second resource corresponding to the adjusted reserved capacity as the data channel resource; and
   transmitting, to the base station, a message including resource allocation information of the data channel resource.

2. The operation method according to claim 1, further comprising:
   dividing modulation and coding scheme (MCS) indexes into a plurality of sections;
   allocating candidate control channel element (CCE) aggregation levels to each of the plurality of sections; and
   providing the base station with information on the MCS indexes of each of the plurality of sections and information on the candidate CCE aggregation levels of each of the plurality of sections.

3. The operation method according to claim 2, wherein the transmitting of the message including the resource allocation information comprises:
   calculating an MCS index corresponding to the channel state of the base station and selecting one CCE aggregation level from candidate CCE aggregation levels corresponding to a section including the calculated MCS index;
   allocating a control channel resource according to the selected CCE aggregation level in a control resource region; and
   transmitting the message including the resource allocation information to the base station by using the allocated control channel resource.

4. The operation method according to claim 1, wherein the transmitting of the message including the resource allocation information comprises:
   determining a CCE aggregation level according to the allocated data channel resource;
   allocating a control channel resource according to the determined CCE aggregation level in a control resource region; and
   transmitting the message including the resource allocation information to the base station by using the allocated control channel resource.

5. The operation method according to claim 4, further comprising:
   repeatedly allocating a control channel resource according to the determined CCE aggregation level in the control resource region; and
   transmitting the message including the resource allocation information to the base station by using the repeatedly-allocated control channel resource.

6. The operation method according to claim 1, further comprising:
   determining corresponding MCS indexes for each CCE aggregation level;
   setting a shortened MCS index having the each CCE aggregation level as most significant 2 bits for each MCS index; and
   providing the base station with information on each CCE aggregation level, information on the MCS indexes, and information on the shortened MCS index corresponding to each MCS index.

7. An operation method of a base station in a backhaul system, the operation method comprising:
   measuring a channel state by receiving a reference signal transmitted from a backhaul station;
   transmitting the measured channel state to the backhaul station;
   transmitting a required capacity to the backhaul station to request allocation of a data channel resource;
   receiving, from the backhaul station, information on a plurality of MCS index sections into which MCS indexes are divided and information on candidate CCE aggregation levels allocated to each section; and
   receiving, from the backhaul station, a message including resource allocation information of the data channel resource based on candidate CCE aggregation levels corresponding to a section including an MCS index corresponding to the measured channel state, the resource allocation information being configured based on the requested capacity and the channel state.

8. The operation method according to claim 7, wherein the receiving of the message including the resource allocation information comprises:
   calculating the MCS index corresponding to the measured channel state, and selecting candidate CCE aggregation levels corresponding to the section including the calculated MCS index; and
   receiving the resource allocation information by performing blind decoding on the selected candidate aggregation levels.

9. The operation method according to claim 7, further comprising receiving, from the backhaul station, information of an MCS index corresponding to each CCE aggregation level and information on a shortened MCS index having each CCE aggregation level as most significant 2 bits for each MCS index.

10. The operation method according to claim 9, further comprising:
    detecting a CCE aggregation level of the message;
    identifying a shortened MCS index included in the message; and
    calculating an MCS index corresponding to the detected CCE aggregation level and the shortened MCS index included in the message with reference to the information on the MCS index and the information on the shortened MCS index.

11. A base station in a backhaul system, the base station comprising:
    a processor;
    a memory electronically communicating with the processor; and
    instructions stored in the memory,
    wherein when executed by the processor, the instructions cause the base station to:
    measure a channel state by receiving a reference signal transmitted from a backhaul station;

transmit the measured channel state to the backhaul station;

transmit a required capacity to the backhaul station to request allocation of a data channel resource;

receive, from the backhaul station, information on a plurality of MCS index sections into which MCS indexes are divided and information on candidate CCE aggregation levels allocated to each section; and receive, from the backhaul station, a message including resource allocation information of the data channel resource based on candidate CCE aggregation levels corresponding to a section including an MCS index corresponding to the measured channel state, the resource allocation information being configured based on the required capacity and the channel state.

12. The base station according to claim 11, wherein in the receiving of the message including the resource allocation information, the instructions further cause the base station to:

calculate the MCS index corresponding to the measured channel state, and select candidate CCE aggregation levels corresponding to the section including the calculated MCS index; and receive the resource allocation information by performing blind decoding on the selected candidate aggregation levels.

13. The base station according to claim 11, wherein the instructions further cause the base station to receive, from the backhaul station, information of an MCS index corresponding to each CCE aggregation level and information on a shortened MCS index having each CCE aggregation level as most significant 2 bits for each MCS index.

14. The base station according to claim 13, wherein when executed by the processor, the instructions further cause the base station to:

detect a CCE aggregation level of the message;

identify a shortened MCS index included in the message; and calculate an MCS index corresponding to the detected CCE aggregation level and the shortened MCS index included in the message with reference to the information on the MCS index and the information on the shortened MCS index.

* * * * *